(12) United States Patent
Ryerson et al.

(10) Patent No.: US 7,612,704 B2
(45) Date of Patent: Nov. 3, 2009

(54) POSITIONING CORRECTION SYSTEM AND METHOD FOR SINGLE AND MULTI-CHANNEL GROUND PENETRATING RADAR

(75) Inventors: Kenneth J. Ryerson, Pella, IA (US); Keith Sjostrom, Des Moines, IA (US); David Hanson, Pella, IA (US)

(73) Assignee: Underground Imaging Technologies, Inc., Latham, NY (US)

( * ) Notice: Subject to any disclaimer, the term of this patent is extended or adjusted under 35 U.S.C. 154(b) by 0 days.

(21) Appl. No.: 12/262,140

(22) Filed: Oct. 30, 2008

(65) Prior Publication Data

US 2009/0109081 A1    Apr. 30, 2009

Related U.S. Application Data

(60) Provisional application No. 61/001,030, filed on Oct. 30, 2007.

(51) Int. Cl.
*G01S 13/88* (2006.01)
*G01V 3/12* (2006.01)

(52) U.S. Cl. .................. 342/22; 342/27; 342/357.08

(58) Field of Classification Search .............. 342/22, 342/27, 174, 357.01, 357.06, 357.08, 357.13, 342/357.14
See application file for complete search history.

(56) References Cited

U.S. PATENT DOCUMENTS

| | | | | |
|---|---|---|---|---|
| 6,429,802 B1* | 8/2002 | Roberts | .................. | 342/22 |
| 6,496,136 B1* | 12/2002 | Mucciardi | .................. | 342/22 |
| 6,496,137 B1* | 12/2002 | Johansson | .................. | 342/22 |
| 6,772,091 B1* | 8/2004 | Roberts | .................. | 702/166 |
| 7,013,991 B2* | 3/2006 | Wilson-Langman et al. | .. | 175/48 |
| 7,057,548 B1* | 6/2006 | Roberts | .................. | 342/22 |
| 7,336,078 B1* | 2/2008 | Merewether et al. | ........ | 324/326 |
| 7,443,154 B1* | 10/2008 | Merewether et al. | .......... | 324/67 |
| 2005/0061547 A1* | 3/2005 | Wilson-Langman et al. | .. | 175/40 |
| 2008/0009969 A1* | 1/2008 | Bruemmer et al. | .......... | 700/245 |
| 2009/0109081 A1* | 4/2009 | Ryerson et al. | ............... | 342/22 |

FOREIGN PATENT DOCUMENTS

DE          10018031 A1    10/2001

OTHER PUBLICATIONS

Aaltonen et al., "Geological Mapping Using GPR and Differential GPS Positioning—A Case Study", Ninth International Conference on Ground Penetrating Radar, Proceedings of SPIE, vol. 4758, 2002, pp. 207-210.

* cited by examiner

*Primary Examiner*—John B Sotomayor
(74) *Attorney, Agent, or Firm*—Hollingsworth & Funk, LLC

(57) ABSTRACT

A mobile geophysical instrument produces geophysical data sets each associated with a position computed by use of a position sensor. A variable time delay results between a time when data for each geophysical data set is collected and a time when a position associated with each geophysical data set is recorded. A module receives distance transducer data and includes circuitry configured to generate a module signal based on trigger signals from the distance transducer and a calibration value. A data acquisition system (DAS) receives geophysical data sets from the geophysical instrument, positioning data from the positioning sensor, and the module signals. The DAS generates a DAS timestamp in response to each module signal and associates the DAS timestamp with each geophysical data set and a position associated with the geophysical data set, so as to substantially eliminate the variable time delay.

24 Claims, 8 Drawing Sheets

POSITIONING CORRECTION SYSTEM AND METHOD FOR SINGLE AND MULTI-CHANNEL GROUND PENETRATING RADAR

RELATED APPLICATIONS

This application claims the benefit of Provisional Patent Application Ser. No. 61/001,030 filed on Oct. 30, 2007, to which priority is claimed pursuant to 35 U.S.C. §119(e) and which is hereby incorporated herein by reference in its entirety.

FIELD OF THE DISCLOSURE

The present disclosure relates generally to the field of subsurface evaluation and object detection, and, more particularly, to systems and methods for improving the positional accuracy of geophysical and geologic data, such as ground penetrating radar (GPR) data for single and multiple channel GPR systems.

BACKGROUND

Various techniques have been developed to detect and locate underground utilities and other manmade or natural subsurface structures. It is well understood that before trenching, boring, or otherwise engaging in invasive subsurface activity to install or access utilities, it is imperative to know the location of any existing utilities and/or obstructions in order to assist in trenching or boring operations and minimize safety risks. Currently-existing location data for buried utilities, however, is often incomplete and suspect in terms of accuracy.

SUMMARY OF THE INVENTION

The present invention is directed to systems and methods for subsurface sensing, characterizing, and/or imaging and associating subsurface data with positioning data with improved accuracy. Embodiments of the present invention may be implemented with a wide variety of instrumentation and systems that provide for subsurface sensing, characterizing, and/or imaging data and corresponding positioning data.

According to various embodiments, a system of the present invention includes a mobile ground penetrating radar (GPR) system. The GPR system comprises an apparatus configured for movement over terrain, such as a cart, a GPR sensor mounted to the apparatus and configured to produce GPR scan data, a positioning sensor supported by the apparatus, and a wheel encoder supported by the apparatus and configured to generate trigger signals for initiating GRP sensor scans. A processor is coupled to memory and supported by the apparatus. The processor is coupled to the GPR sensor, the positioning sensor, and the wheel encoder, and is configured to execute program instructions stored in the memory for collecting data for each GPR scan and recording position data for each GPR scan. A variable time delay results between a time when the GPR scan data is collected and a time when the position data associated with the GPR scan data is recorded.

An encoder capture module (ECM), according to embodiments of the invention, is adapted for attachment to the apparatus. The ECM comprises an input adapted to receive the trigger signals generated by the wheel encoder, circuitry coupled to the input and configured to generate an ECM signal based on each trigger signal and a calibration value, and an output. A data acquisition system is coupled to the output of the ECM and is configured to receive GPR scan data from the GPR sensor, positioning data from the positioning sensor, and the ECM signals from the ECM. The data acquisition system is configured to generate a DAS timestamp in response to each ECM signal and to associate the DAS timestamp with the GPR scan and the GPS position associated with the GRP scan, so as to substantially eliminate the variable time delay.

Embodiments of the present invention are directed to a system comprising a mobile geophysical instrument configured for traversing along an above-ground path, a processor, a distance transducer configured to produce trigger signals, and a position sensor. The geophysical instrument is configured to produce a plurality of geophysical data sets as the geophysical instrument traverses the above-ground path, wherein data for each geophysical data set is associated with a position computed by use of the position sensor. A variable time delay results between a time when data for each geophysical data set is collected by the processor and a time when a position associated with each geophysical data set is recorded by the processor.

A module according to embodiments of the invention is adapted for attachment to the geophysical instrument and comprises an input adapted to receive the distance transducer data, circuitry coupled to the input and configured to generate a module signal based on each trigger signal and a calibration value, and an output. A data acquisition system (DAS) is coupled to the output of the module and is configured to receive geophysical data sets from the geophysical instrument, positioning data from the positioning sensor, and the module signals. The data acquisition system is configured to generate a DAS timestamp in response to each module signal and to associate the DAS timestamp with each geophysical data set and a position associated with the geophysical data set, so as to substantially eliminate the variable time delay.

In accordance with other embodiments of the present invention, a module is adapted for use with a system comprising a data acquisition system (DAS) and a mobile ground penetrating radar (GPR) system. The GPR system comprises a GPR sensor, a processor, a distance transducer configured to produce trigger signals, and a position sensor. The GPR system is configured to produce scans of GPR data, wherein data for each GPR scan is associated with a position computed by use of the position sensor. A variable time delay results between a time each scan of GPR data is collected by the processor and a time a position associated with each scan of GPR data is recorded by the processor. The DAS is configured to receive GPR scan data from the GPR sensor, positioning data from the positioning sensor, and signals from the module. The DAS is configured to generate a DAS timestamp based on each module signal and to associate the DAS timestamp with each GPR scan and a position associated with the GRP scan.

The module, according to embodiments of the invention, comprises an input adapted to receive the trigger signals, circuitry coupled to the input and configured to generate a module signal based on each trigger signal and a calibration value, and an output that provides the module signal for use by the DAS to generate a DAS timestamp that can be associated with each GPR scan and a position associated with the GRP scan so as to substantially eliminate the variable time delay.

According to further embodiments of the present invention, a system comprises a wheel encoder, a time-based sensor, and a distance-based sensor coupled to the wheel encoder, wherein sensor readings from the distance-based sensor are made in response to trigger signals produced by the encoder wheel. An encoder module is configured to receive the trigger signals and generate encoder module signals using the trigger signals and a calibration value. A computer clock time generator is responsive to the encoder module signals and configured to assign a computer clock time to the sensor readings from the distance-based sensor and to sensor readings from the time-based sensor. A processor is configured to merge the distance-based sensor readings with the time-based sensor readings based on synchrony between the respective computer clock times of the distance-based sensor readings with the time-based sensor readings. The processor is configured to generate an output file comprising at least the distance-based sensor readings and their respective computer clock times. The processor may be configured to produce a geospatial position for each encoder module signal.

In accordance with other embodiments of the present invention, a method involves collecting a plurality of geophysical data sets in response to trigger signals produced by a distance transducer while a geophysical instrument traverses an above-ground path, and computing a position of the geophysical instrument while the geophysical instrument traverses the above-ground path. The method further involves associating, in response to the trigger signals, the geophysical data sets with computed positions, a variable time delay resulting between a time when data for each geophysical data set is collected and a time when the position associated with each geophysical data set is recorded. The method also involves producing an adjusted trigger signal based on each trigger signal and a calibration value, and generating a timestamp that can be associated with each geophysical data set and a position associated with the geophysical data set so as to substantially eliminate the variable time delay.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 6(A) and 6(B) show representative data collected with and without a constant timeshift applied to TMF file data;

FIGS. 6(C) and 6(C) show representative data collected with and without a constant timeshift applied to position marker file data produced by use of an encoder capture module of the present invention;

Figure 1:
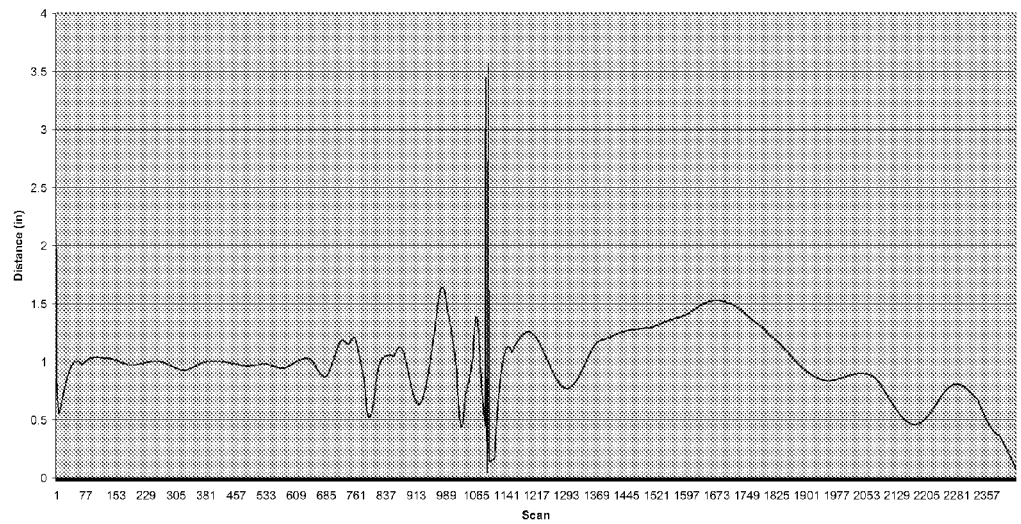
FIG. 1 shows a plot of the distance between scans computed from GPS positions generated from a Terravision recorded time marker file, the plot showing that the distance between scans is highly variable and unpredictable.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DESCRIPTION OF VARIOUS EMBODIMENTS

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

Systems, devices or methods according to the present invention may include one or more of the features, structures, methods, or combinations thereof described herein. For example, a device or system may be implemented to include one or more of the advantageous features and/or processes described below. It is intended that such a device or system need not include all of the features described herein, but may be implemented to include selected features that provide for useful structures, systems, and/or functionality.

The description of the methods and systems provided in the present disclosure is generally directed to embodiments of a visualization tool for subsurface imaging and evaluation. The methods and systems described within the context of such visualization tool is for non-limiting illustrative purposes only. Techniques and devices disclosed herein may be implemented in other types of evaluation systems and are not limited to subsurface imaging systems such as those described hereinbelow. The following description of various features and cooperation between features is not exhaustive nor limiting as to other features and combinations thereof that are contemplated.

During preparation of ground penetrating radar units for anticipated use in a mapping project, serious questions arose as to the positioning accuracy of algorithms and techniques used for both single channel GPR units and multi-channel GPR units. One particular type of GRP evaluated was the Terravision 3D GPR, manufactured by Survey Systems, Inc, North Salem, N.H. (GSSI). With testing of the different units, it was found that when positioning was applied using any external instrument (e.g., G30L, Navcom, Ashtech, Trimble S6, etc.), those positions assigned to the GPR traces were incorrect. The cause of this error was not readily apparent, and required extensive analysis to determine the source of error. This error was eventually traced to the manner in which positions are correlated with GPR scans. After testing confirmed the presence and nature of this error, a solution was devised and tested. This solution involves the use of a small additional hardware circuit and processing software. Application of this correction reduced location errors by as much as an order of magnitude. The cost of the additional hardware is approximately $90 to $100, and use of the fix is transparent to the user.

Positional accuracy when using 3D GPR specifically, and multiple sensors in general, is crucial to the use of these instruments in mapping underground utilities. Without confidence in the locations of data collected in the field, all results are suspect and in effect are worse than no data at all.

This disclosure describes the discovery and correction of a positioning problem existing in a popular GPR system, referred to as the Terravision GPR system, manufactured by GSSI, and that also appears to exist in all SIR systems produced by GSSI. In short, there is a variable time lag between the moment that position data is collected and time stamped, and the time the GPR trace is collected and stamped. This delay results in an error in the location assigned to the GPR scan. Not only does this delay result in an error in the position of any feature detected with respect to an external reference frame, but due to the variable nature of the delay, relative locations within a data line are also in error.

Fortunately, corrective action is possible, although not retroactively on data already collected. A set of hardware and software fixes may be implemented that are transparent to the user, and in fact reduce the complexity of the Terravision operation. The hardware required is estimated to cost about $90 to $100 to produce and its use is absolutely required when the Terravision is used in any application where positions are not based on a wheel encoder derived grid or when start and end points of straight lines are surveyed in after data collection. It is understood that the positioning correction methodology disclosed herein is applicable to a wide range of systems and instruments, and is not limited to use only in the context of the particular embodiments discussed herein.

A series of test lines were collected in a field test in Pella, Iowa, using a single channel SIR-3000 with GPS positioning. It was anticipated that this single channel data would be used to supplement Terravision data for a project in Troy, N.Y. Currently, both types of data can be simultaneously displayed and merged in SPADE (a data visualization tool discussed below).

When these data were analyzed, it was found that the position of a buried pipe target did not align with its known position. When a wheel encoder alone was used to obtain position data, the pipe was in its correct location. That is, if the pipe was known to be 25 feet from the beginning of the line, this is where straight lines using the encoder for positioning placed it. However, when the Time Mark File (TMF) generated by either the Terravision or SIR-3000 software was used to locate the GPR traces using GPS positions, the pipe was no longer located in the data 25 feet from the start of the line. There was a shift present in the data. A similar shift was found in EMI data as a result of a delay between the time data were collected and the time a GPS position was time-stamped and correlated with the data. This was due to a constant delay in the EMI data processing hardware and software. When a constant time shift was applied to the GPR data, however, no single time shift correctly positioned all the data traces.

There exists a variable time shift between the moment the GPR scans are collected and when the GPS location is time-stamped to correlate with the data. That is, the GPR data are collected, and then at some other time, a position from the GPS sensor is recorded and correlated with the GPR scan.

It was found that the Time Mark File (TMF) created by the Terravision software during data collection contained a varying time delay between records. Since this TMF file is the basis for correlation between the GPR data traces and the GPS data points, any time error causes a positional shift in the data. The first course of action was to attempt to correct the time delay by offsetting the timestamps in the TMF file by a constant value. However, since this time shift is variable and unpredictable, this simple method was not adequate to correct the data. Furthermore, the Terravision only provides a timestamp approximately every 2 seconds. This required intermediate data timestamps to be interpolated, which further compounded the uncertainty in positioning.

Because of the variable time lag, the distance between scans computed from GPS (or laser) positions is not the same as that recorded from the wheel encoder. The wheel encoder controls firing of the antennas and is typically set so the antenna fire 12 times per foot or once per inch. This value can be set very accurately through a calibration procedure that sets the number of wheel encoder pulses per unit length. FIG. 1 shows a plot of the distance between scans computed from GPS positions (Navcom GPS) generated from the Terravision recorded TMF file. The distance should be at one inch throughout the entire line. As can be seen, the distance between scans is highly variable and unpredictable.

Several undesirable effects result from the variable distance between scans. First, the overall position of the data with respect to an external reference frame is wrong, and so all target positions are in error. Second, locations of targets within a swath are mislocated with respect to each other, within the swath. Since the time lag is variable and unpredictable, it is not possible to correct the lag and positions after the data are collected.

Figure 2:
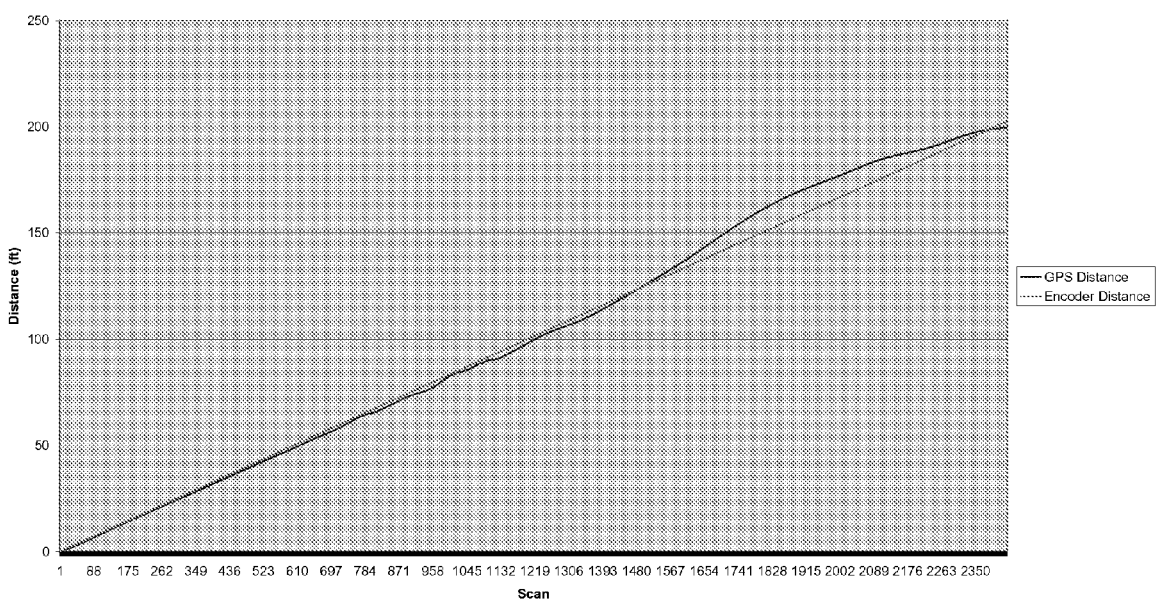
FIG. 2 illustrates how variable scan distance as shown in FIG. 1 results in errors in cumulative distance along the line shown in FIG. 2.

The variable scan distance shown in FIG. 1 results in errors in cumulative distance along the line as shown in FIG. 2. As shown here, the difference in cumulative distance along a straight line between wheel encoder distances and those computed from high accuracy GPS positions is variable and up to 11 feet in this example. It is noted that data from FIGS. 1 and 2 came from the same data set.

Figure 3:
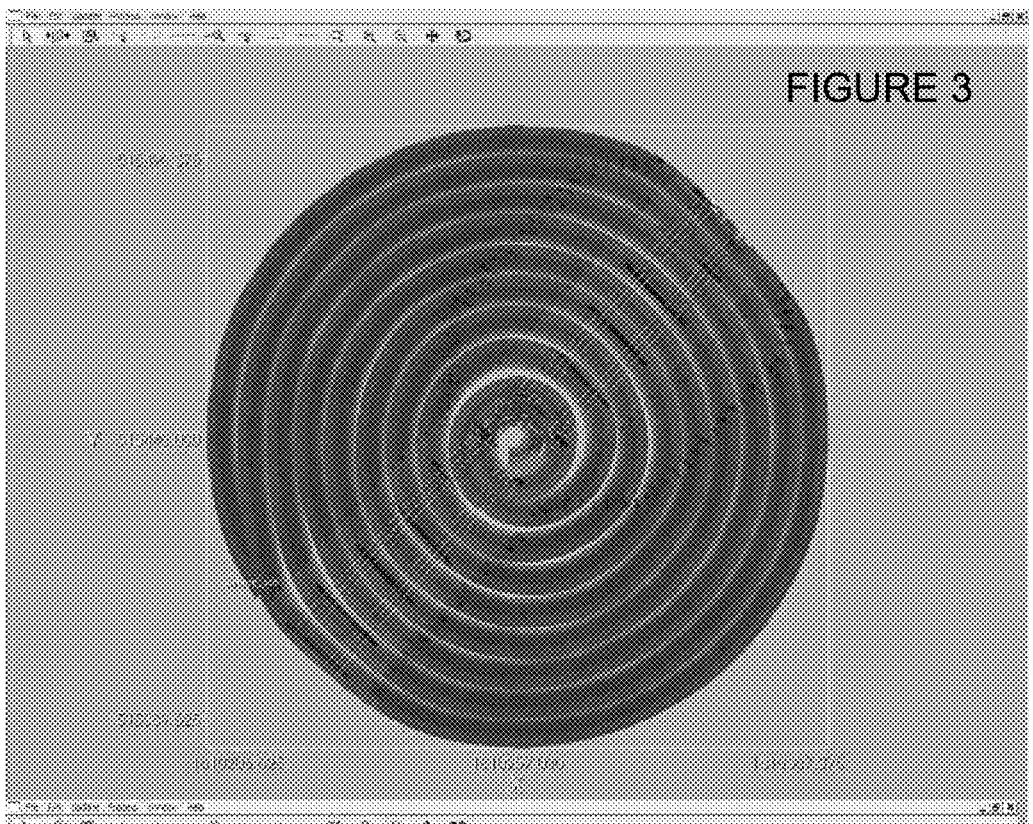
FIGS. 3 and 4 illustrate another example of the error existing in GPS positioned data.
Figure 4:
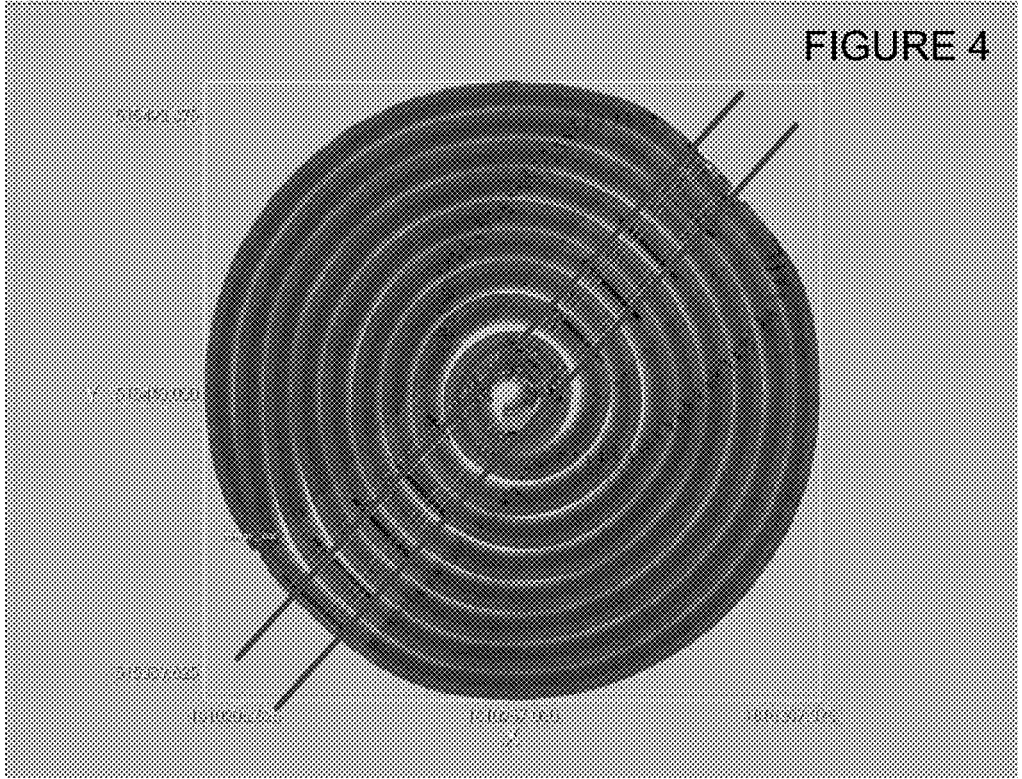

Another example of the error existing in GPS positioned data is seen in FIGS. 3 and 4. FIG. 3 shows a spiral of Terravision data collected in Pella, Iowa. The linear array of white dots crossing the circle is reinforcing girders placed in concrete. They should be aligned across the circle. FIG. 4 shows the misalignment present.

Another question that arose was how bad was data collected and interpreted with GPS or laser positioning systems before the time lag issue was found. In test data collected during this evaluation, errors as large as 20 feet were seen, depending on test conditions and collection speed. Data collected to date most likely had errors on the order of 4 feet or less. This is due several factors. First, data were collected at slow speed, minimizing the scan to scan distance variation. Second, nearly all data and jobs collected to date were performed with swaths collected in the same direction, with starting points side by side. This also helped to minimize errors. Third, most data collected to date were in straight lines and with start and end points surveyed after collection. The time lag error does not exist for these data. While it is not felt that large errors were introduced in existing data, as more operators are used, techniques to collect data are varied, and more data are collected with non-encoder means, the time lag error must be corrected.

To solve the time lag problem, a capture module (Encoder Capture Module or ECM) was designed which intercepts data from the Terravision encoder wheel. The module is based on an 8-bit microcontroller (PIC 16F628, FLASH-based 8-Bit CMOS microcontroller available from Microchip Technology, Inc.). The microcontroller monitors the raw encoder data and counts the number of quadrature cycles. After a predetermined number of cycles have passed, the microcontroller toggles an external signal to indicate that a new data scan has been fired by the GPR antenna. This calibration value is configurable over a serial connection, which is handled by the data acquisition software (e.g., UITDAS or DAS, as will be discussed with reference to the embodiment illustrated in FIG. 10). The data acquisition software is configured with the same wheel calibration value set in the Terravision software. From that value, the data acquisition software computes the number of wheel ticks per data scan and relays the value to the capture module. The data acquisition software then monitors the scan signal and timestamps every new scan fired. This data is compiled into a TMF format file and saved alongside the GPS data.

The new TMF file generated with the ECM and the data acquisition software now contains a timestamp for every datascan recorded by the GPR. Furthermore, the timestamps are more precise than the timestamps recorded internally in the Terravision system and they are consistent with the GPS timestamps since both the GPS and GPR scans are being time-stamped internal to the data acquisition software. Recent testing has shown that this more precise timestamp file produces a much higher accuracy in GPR data positioned with GPS data.

Figures 5, 6:
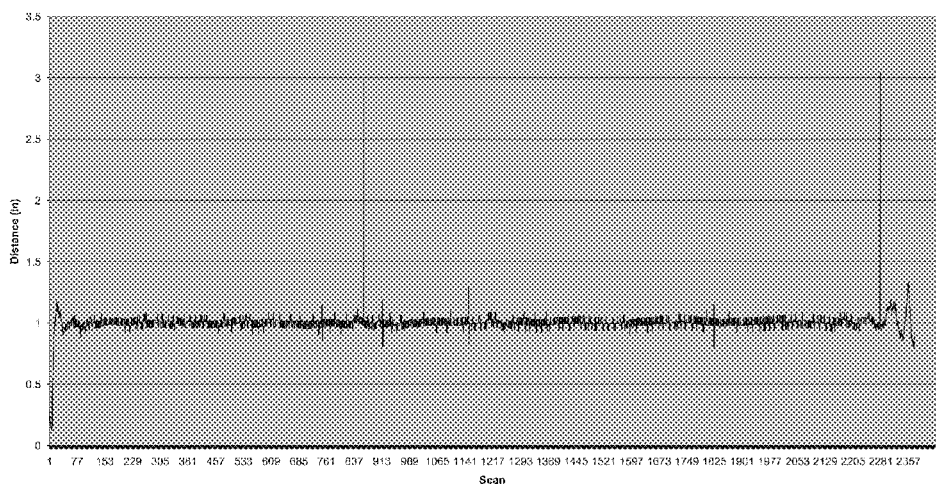
FIG. 5 shows a plot of data representing a comparison between the distance between scans based on a wheel encoder and that from GPS locations calculated from the data produced by an encoder capture module (ECM) of the present invention.

A comparison between the distance between scans based on the wheel encoder and that from GPS locations calculated from the ECM data and the data acquisition software generated TMF file was made to check position accuracy. FIG. 5 shows a plot of these data. Note that the value should be a constant 1.0 inch per scan. FIG. 5 should be compared to FIG. 1, the comparable plot from the Terravision generated TMF file. Results from the ECM are much closer to the theoretical value and result in much more accurately positioned data.

Several sets of data have been collected to test the operation of the ECM and modifications to the data acquisition software. FIG. 6 shows an example of these data with straight line paths. Two side by side swaths of Terravision data were collected along a road on the Vermeer property, Pella, Iowa. At three locations, aluminum duct tape was placed across the road as marker targets. Two strips of tape went across the road normal to the path direction, and one stripe was placed at an angle. All stripes were approximately 4 inches wide. Position information was provided by a Navcom 2050G GPS unit.

In the upper set of data (FIG. 6A), the TMF file generated in the Terravision software was used to compute positions. The first swath shows the data plotted as it would be with no corrections to the positions to accommodate the time lag and represents data as it would have appeared prior to the discovery of this problem. The two stripes perpendicular to the swaths should be a single line and not be broken where the two swaths mate. In addition, both swaths started at the same location, and this is not reflected in the data shown. Finally, the diagonal stripe should be a single line, and is broken at the swath break. It should be noted that the diagonal tape stripe appears broken into segments. This is due to the relative orientation of the swath, antennas, and the tape. Polarization effects cause the tape to not be detected with alternate antennas due to their 45° herringbone orientation pattern. This is a normal effect.

The second plot from the top (FIG. 6B) shows the effect of attempting to correct the misalignment with a constant time shift applied to the time stamps in the Terravision generated TMF file. As can be seen, a constant shift is not successful in correcting the data.

The second pair of swaths (FIGS. 6C and 6D) show the same data, but with the encoder tics collected with the ECM and the TMF file generated within the data acquisition software. The upper of these two sets (FIG. 6C) shows the data as it would appear with no additional processing, and so corresponds to the top data set that shows Terravision generated positions. The stripes are much better aligned, and the swaths begin at the same point, as they should. There is, however, a small shift still present in the stripes. It was found that there was a small constant time shift present that is most likely due to overhead required by the software to collect and store data. The bottom plot (FIG. 6D) shows the same data again, this time with a constant time shift of 0.08 seconds applied to the TMF file. The tape stripes are now nearly perfectly aligned.

The ECM and data acquisition software generated TMF files along with a constant time shift of 0.08 seconds (applied in the data processor engine) appear to correct all the issue in straight line data. The next question was whether or not curved lines could be correctly positioned.

Figure 7:
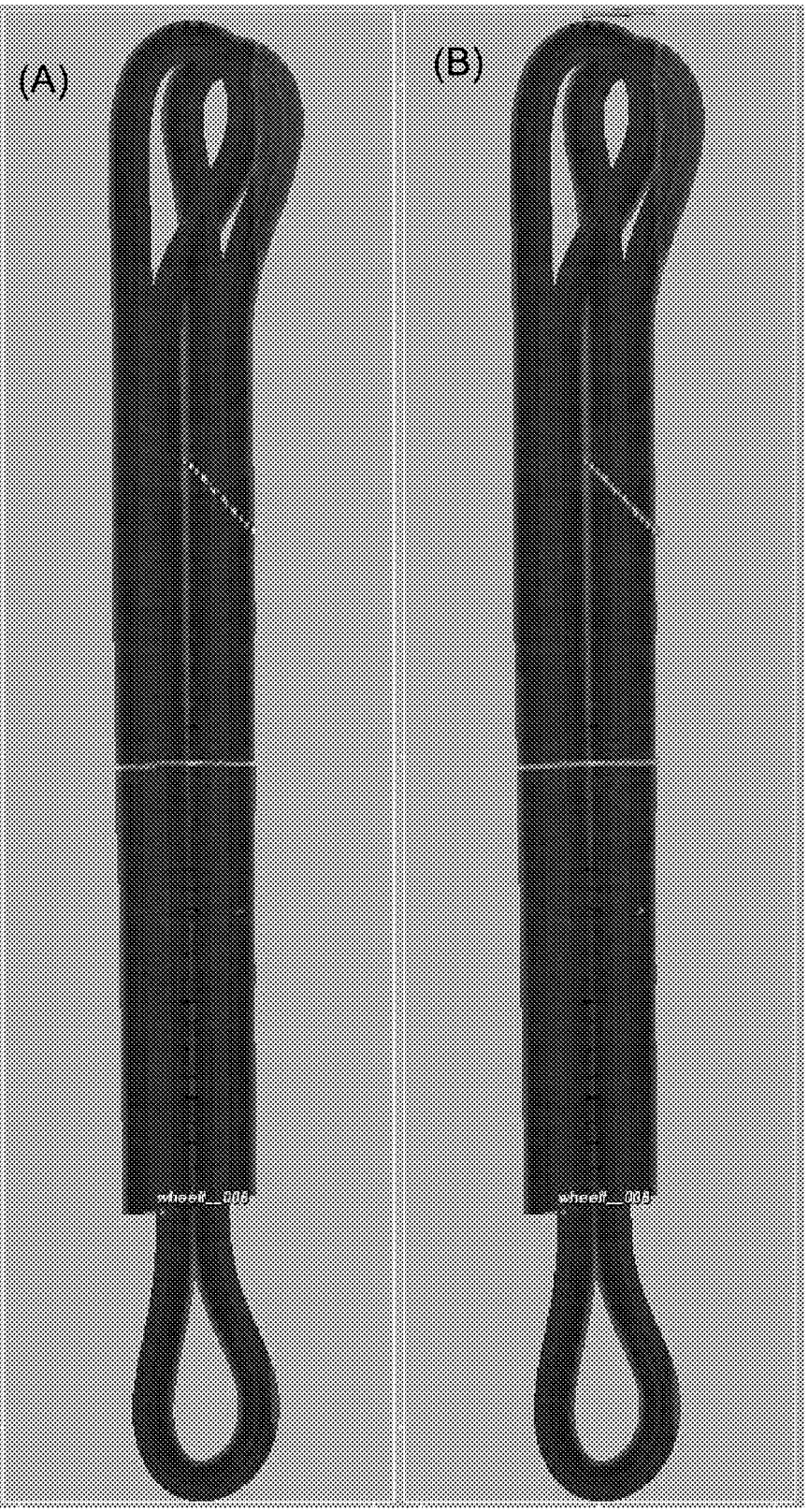
FIGS. 7(A) and 7(B) show ECM positioned data for complex paths, with the ECM positioned data in good alignment with the tape stripes.

FIG. 7 shows a single long Terravision line that passed over the perpendicular tape stripe 4 times and the diagonal stripe twice. The left hand figure (FIG. 7A) shows the ECM positioned data, with the tape stripes in good alignment. The question remains, are the stripes in the correct location with respect to an external global reference frame? The right hand figure (FIG. 7B) shows the same data, but with the tape positions collected with a static GPS sensor held over the ends of the stripe shown in green. Not only are the stripes correctly aligned, but their position along the line matches that measured separately with GPS very well.

Figure 8:
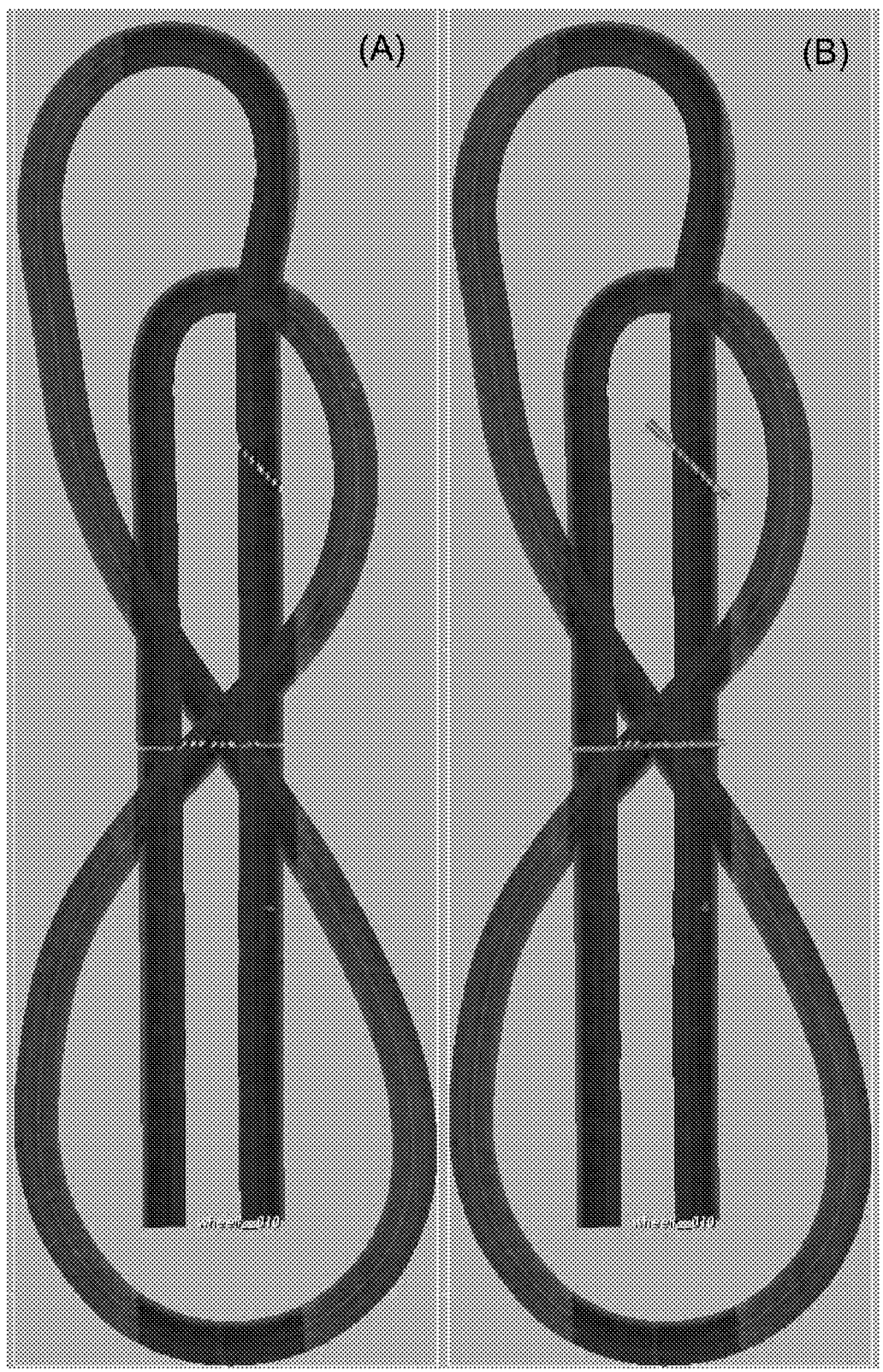
FIGS. 8(A) and 8(B) show ECM positioned data for complex paths, with the ECM positioned data in good alignment with the tape stripes.

Another test run was made over the same targets where the stripes oriented perpendicular to the road were crossed at oblique angles to test the ability of the new technique to correct locations at different relative orientations to the Terravision paths. Several figure eight paths were driven and the data processed with the ECM and the data acquisition software (constant 0.08 second shift). The results are shown in FIG. 8 (FIGS. 8A and 8B). Both the alignment and absolute position of the stripes match well.

Figure 9:
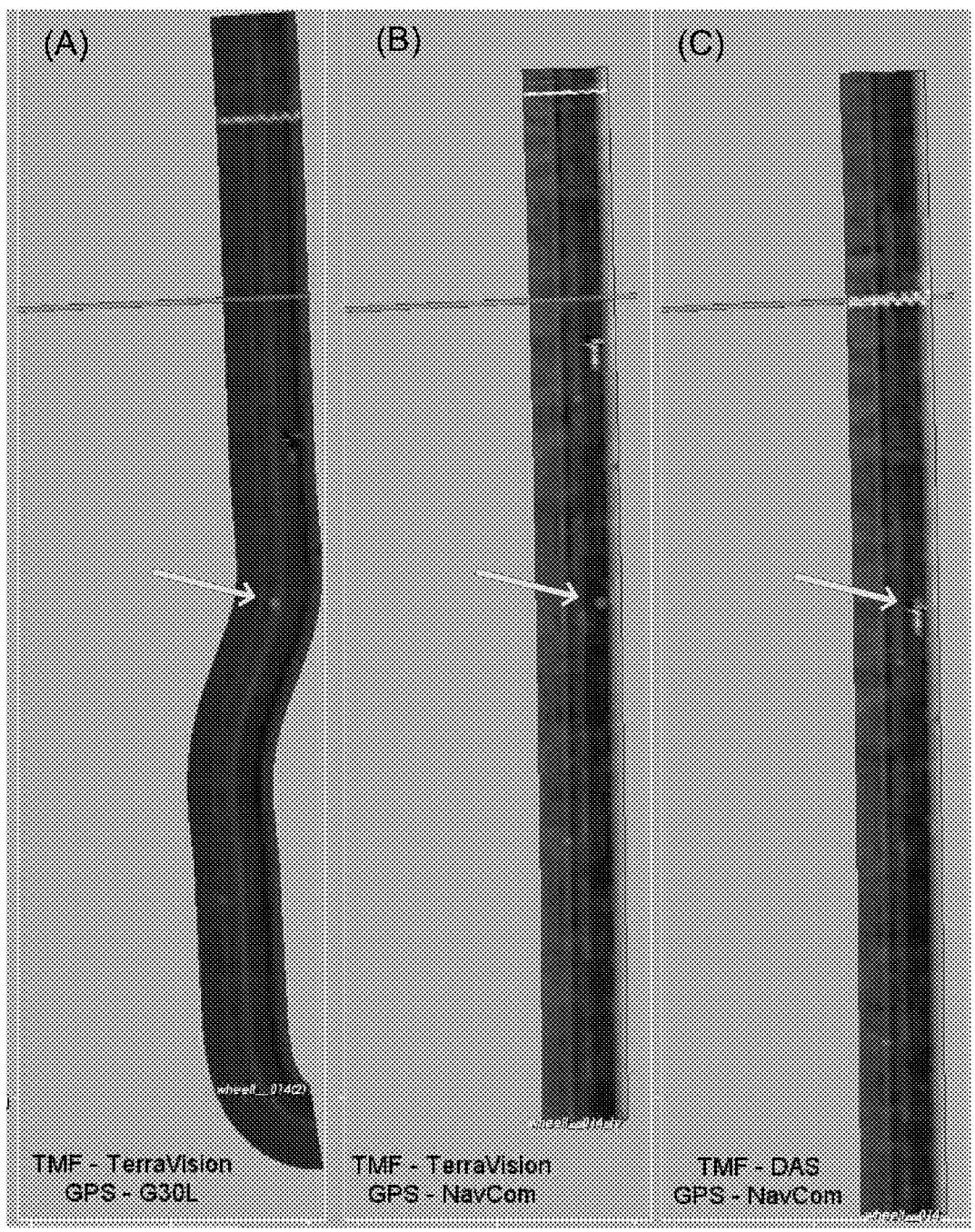
FIGS. 9(A), 9(B), and 9(C), show data from a simultaneous test of various positioning systems for configurations with and without an ECM of the present invention.

Finally, a simultaneous test of all the positioning systems was performed. Results are shown in FIG. 9. The data shown here is all the same single swath of Terravision data, collected during the same pass, with only different positioning techniques applied. On the left (FIG. 9A) is the pass positioned with the Terravision generated TMF file, using the positions collected from the G30L, as supplied by GSSI. The white stripe is the target tape stripe and the green line is the Navcom measured static location of the tape. Thus, the green line is assumed to be the actual position of the tape in a global reference frame. In addition, the green dot (indicated by an arrow pointed near the center of the swath) shows the Navcom position of a six inch square of metal tape. In the first panel, positions are completely unacceptable. The line is not straight and none of the targets are correctly located. The middle panel (FIG. 9B) also uses the Terravision generated TMF, but now uses the improved location data from the Navcom. The overall position and length of the swath have improved, but the location of the tape targets is still nearly 20 feet off. Finally, the right panel (FIG. 9C) shows the same data with the ECM/data acquisition software and Navcom. It can be seen that the line is straight, the correct length, and the targets are located correctly.

Results of the tests performed above conclusively show that there is a positioning problem when the Terravision software is used to generate TMF files and the G30L is used to supply positions. A solution has been created that appears to correct both alignment and absolute position errors to a degree acceptable for mapping utilities.

The solution prepared involves the use of a supplemental Encoder Capture Module and modifications to the data acquisition software. These corrective kits may be supplied to users of existing systems-especially if GPS or other positioning sensors are used with the Terravision. The ECM is configured to plug into the wheel encoder cable supplied with the Terravision. Two additional cables are then required, one to go from the ECM to the encoder port on the Terravision antenna and the other a serial cable to go to the COM1 port of the Toughbook data acquisition computer. This is the only hardware required. The ECM (as with the wheel encoder) is powered via the GPR antenna bank.

In terms of software, it is no longer necessary or desirable to use any of the GPS options available in the Terravision software. This simplifies operation of the Terravision as the separate commands and checks needed to enable the GPS in Terravision are no longer used. In addition, the GPS synchronization signal used in the data acquisition software to lock the Terravision and an external GPS signal are no longer needed. All position and TMF file generation is handled in the data acquisition software without any hardwired connections between the Terravision and data acquisition computers. Thus, wiring between the computers is eliminated, reducing the possibility of errors in setup. The data acquisition software (e.g., DAS) setup is likewise simplified, as only the external positioning sensor needs to be enabled. Finally, the creation of a TMF file from the ECM is independent of the positioning sensor, which can be an Ashtech or Navcom GPS (or any GPS with a NEMA data string), an Arcsecond laser system, a Trimble S6 laser tracking theodolite, or any position sensor of adequate accuracy and a data stream compatible with the data acquisition software. In fact, since the Terravision software is no longer used to create the TMF file, any position message format could be used. The requirement of a GGA NEMA string has been removed. Thus, the choice of positioning hardware has been dramatically expanded. In addition, single channel GPR data collected with a SIR system and GPS input is immediately compatible with this system. In the future, it is probable that it would be simple to modify the protocols to accept data from GPR units of other manufacturers.

Some additional testing may be performed, if desired, to better define the early time antenna triggering on the Terravision, use of the ECM via the slave antenna bank, the affect of using faster GPS acquisition rates such as with the Ashtech receiver, and using the ECM with the single channel SIR-3000 control unit.

Figure 10:
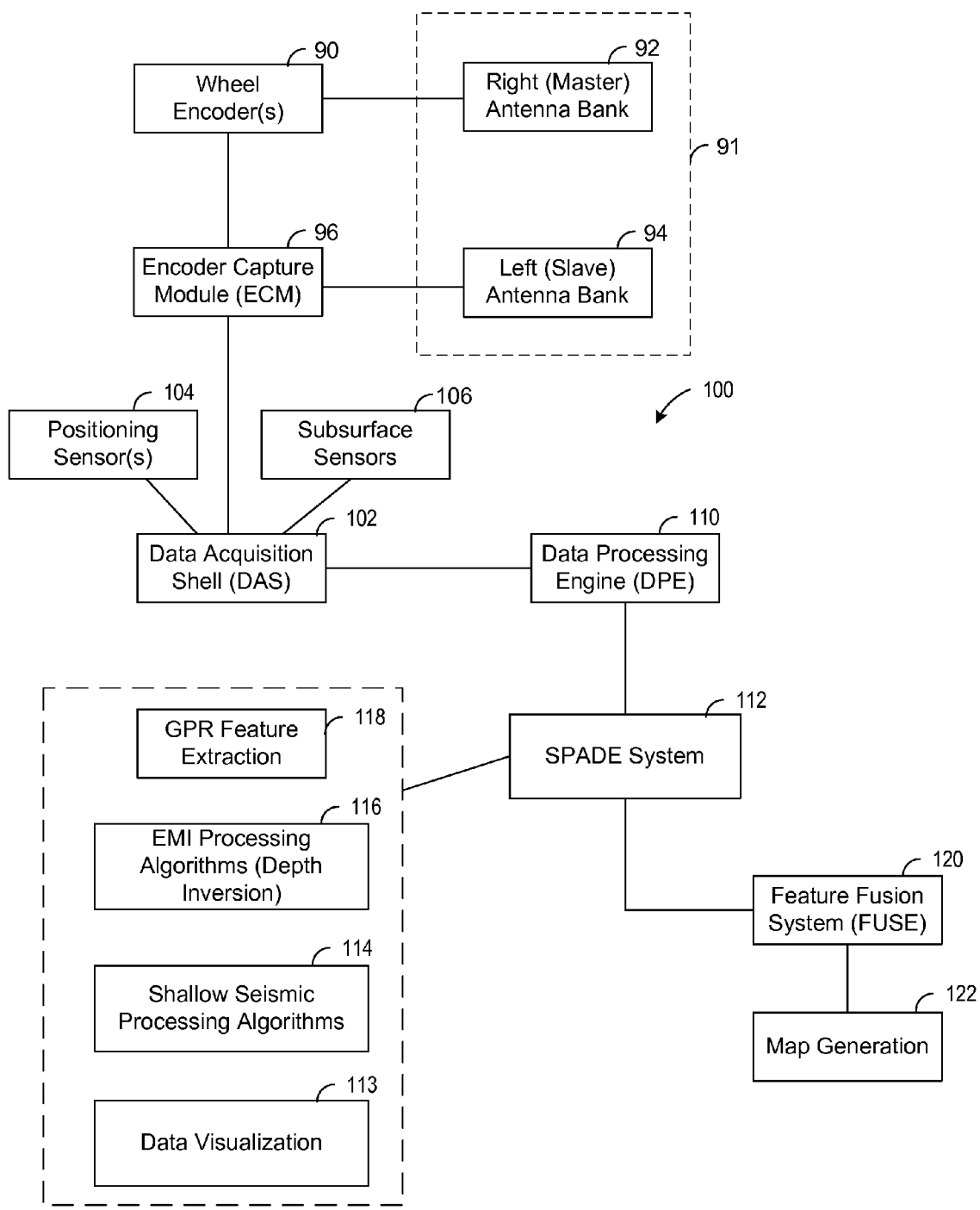
FIG. 10 shows a system for evaluating a subsurface in accordance with various embodiments, in particular a positioning correction methodology of the present invention.

FIG. 10 shows a system for evaluating a subsurface in accordance with various embodiments. The positioning correction methodology discussed above may be implemented within the context of the system and/or sub-system embodiments illustrated in FIG. 10.

The system 100 includes a number of sub-systems that perform useful and unique functions. These sub-systems include a data acquisition shell (DAS) 102, a data processing engine (DPE) 110, a data visualization tool (SPADE system) 112, and a feature fusion system (FUSE) 120, which may include a map generation sub-system 122. As is shown in FIG. 10, DAS 102 receives data acquired from one or more positioning sensors 104 and two or more subsurface imaging or detection sensors 106. Typical positioning sensors 104 include mobile and fixed GPS sensors, and a positioning sensor. Typical sensors 106 include GPR (e.g., 14 channel GPR) 91, multi-unit electromagnetic imaging (EMI) sensor, and a high frequency shallow application seismic sensor. It is understood that other geophysical or subsurface sensors may be employed to facilitate subsurface and soil geology/soil mechanics evaluation, including a multiple-unit magnetic field sensor, resistivity sensor, gravity sensor, for example. Data from such other sensors may also be ported to DAS 102, and that such data may also be tagged with positioning data.

DAS 102 operates as an umbrella or shell for the various sensors 104, 106, 91. DAS 102 provides a number of functions, including navigation of a site. In a typical system deployment, DAS 102 may receive multiple GPS sensor data, multiple (e.g., three) EMI sensor data, GPR sensor positioning data, EMI sensor positioning data, and positioning sensor data. In this regard, DAS 102 collects separate, asynchronous data streams for the various subsurface imaging or detection sensors 106, 91 and positioning sensor 104, such as one or more GPS sensors. DAS 102 may also be configured to implement a cart dynamics algorithm and provides very accurate positioning and co-registration of all data sets, thus allowing for alignment of such data for presentation in true geometry, although this function is preferably performed by DPE 110. Details concerning the cart dynamics algorithm and other aspects of the systems and sub-systems illustrated in FIG. 10 are disclosed in commonly owned U.S. patent application Ser. No. 11/804,217 filed May 16, 2007 (under Attorney Docket No. VMC.044.U1), and Ser. No. 11/804,310 filed May 16, 2007 (under Attorney Docket No. VMC.043.U1), both of which claim the benefit of U.S. Provisional Application Ser. No. 60/800,874 filed May 16, 2006 (Attorney Docket No. VMC.043.P1), and each of which is incorporated herein by reference.

During data collection, real time sensor location can be plotted on an uploaded geo-referenced map or photograph. DAS 102 also provides for EMI sensor calibration and survey control, a battery monitor, remote sensor evaluation, preliminary sensor data processing, and a full on-line help facility.

DPE 110 provides a processing engine for data reduction and production of files appropriate for other analysis software. DPE 110 is preferably configured to implement a cart dynamics model algorithm to compute sensor locations based on a single position sensor control. DPE 110 converts collected positions to any of a plurality of global reference frames, and assigns an accurate x, y, z position to every sensor data point. Multiple position sensors and formats are supported by DPE 110, including both straight and curvilinear data tracks. DPE 110 supports operation of ground penetrating radar in both single and multiple antenna formats, and reduces the time from data collection to the analysis stage from hours to minutes.

In general, and as discussed above, when using a distance-based sensor system controlled by a wheel encoder in tandem with other time-based sensor systems, it becomes difficult to synchronize data from the individual sensors with respect to time. Furthermore, if the distance-based sensor is a closed system with no reliable method for obtaining an accurate timestamp for sensor readings, the problem of time synchronization is made more difficult, if not impossible. By inserting a simple programmable hardware module in series with the encoder wheel signal line as described herein, the sensor readings from the distance-based system can be accurately time-stamped and recorded for synchronization with other time-based sensors. Data provided by the hardware module may be used to synchronize the GPR data with data collected from a time-based positioning system such as GPS.

As was discussed above, during recent projects where the Terravision GPR system was used with GPS data positioning, offsets were noticed between the position of interpreted subsurface linear features and the depicted map location. At first, these offsets were thought to be caused by the lack of known survey control points at the project site or errors generated during conversion of the positioning coordinates. The target positioning offsets were most noticeable when the adjacent GPR survey swaths were acquired in alternating directions and when the position of the GPR detected target did not compare with the stationary positioning measurements. It is noted that this effect was also noticed with the SIR-3000 GPR system when trying to position data with a GPS device.

Extensive testing was performed to quantify this offset error and develop survey methods or processing algorithms to minimize this effect. What was found was that with the current Terravision GPR system, the target offset could not be corrected using a constant time value as is with the case with the multiple sensor TDEM system. This offset varies in time and is dependent on the survey speed during data collection, the way that the data is stored on the control unit, and acquisition rate of the GPS positions. With the existing Terravision GPR system, properly correcting for the target offset could not be accomplished. This led to the development of the Encoder Capture Module (ECM).

Figure 11:
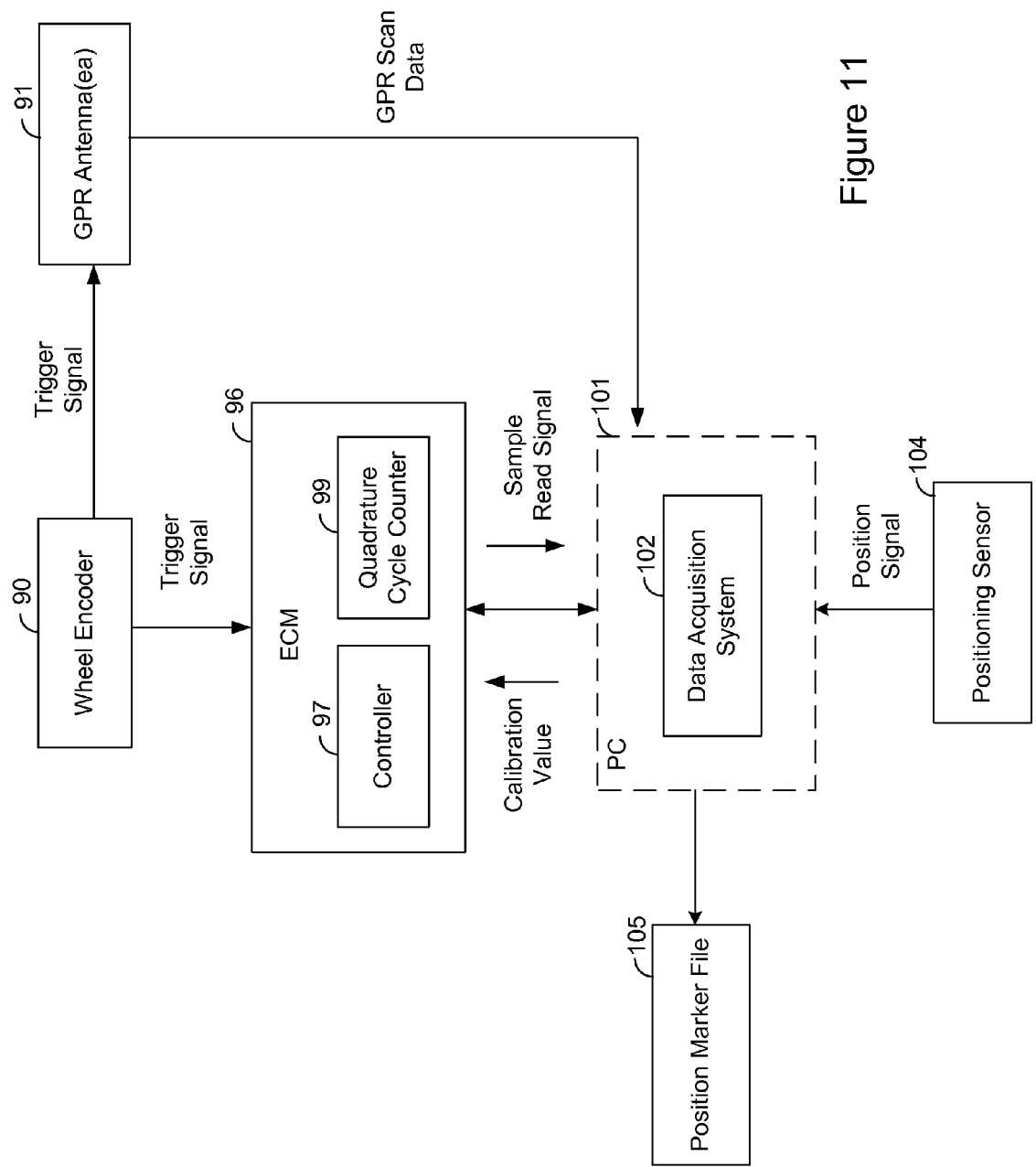
FIG. 11 is a block diagram of various components of a positioning correction system of the present invention.

FIG. 11 is a block diagram of various components of the ECM 96, including a controller 97 and a counter 99, which is preferably configured as a quadrature cycle counter. The ECM 96 receives a trigger signal from the wheel encoder 90, which triggers firing of the GRP antennae 91 (e.g., array or arrays). The ECM 96 generates an ECM module signal, such as a sample read signal, based on the trigger signal and a calibration value. The calibration value is preferably stored in the DAS 102 and is transmitted to the ECM 96. Communication between the ECM 96 and the DAS 102 is bidirectional, as is shown in FIG. 11.

The DAS 102, which may operate on a PC 101 or other computing device or system, is configured to receive GPR scan data from the GPR sensor 91, positioning data from the positioning sensor 104, and the ECM signals from the ECM 96. The DAS 102 is configured to generate a DAS timestamp in response to each ECM signal and to associate the DAS timestamp with the GPR scan and the GPS position associated with the GRP scan, so as to substantially eliminate the variable time delay. The DAS 102 is configured to generate a position marker file 105 comprising data of each GPR scan and a timestamp associated with the data of each GPR scan. The position marker file 105 may also comprise the GPS data that is time-correlated with each GPR scan.

According to an embodiment, and with continued reference to FIGS. 10 and 11, a Terravision GPR cart has two built in wheel encoders, represented in block 90 of FIGS. 10 and 11, used to trigger the 14 channel antenna array 91. The scan rate may be set in the Terravision software at 12 scans/ft (40 scans/m) or 6 scans/ft (20 scans/m). The wheel encoder 90 is connected directly to either the Right (Master) Antenna Bank 92 or Left (Slave) Antenna Bank 94 of the GPR system 91, as is shown in FIG. 10. The Encoder Capture Module 96 is connected between the wheel encoder 90 and the adjacent antenna bank 94.

The ECM 96 preferably has the following characteristics: the signals received from the wheel encoder 90 should be sensed without affecting the operation of the sensor system; the ECM 96 communicates with a data logger (PC or other suitable programmable logging system) using a serial connection; a simple signal is sent on the serial connection to indicate each sample read by the sensor; and a configuration and direction value can be sent to the ECM 96 to set the number of encoder ticks for each data reading. This configuration value will synchronize the ECM signal with the actual readings taken by the sensor.

A 9-pin serial cable is connected to the ECM box 96 and a computer running the Data Acquisition Shell (DAS) software application 102. The DAS software 102 effectively counts the number of times the wheel encoder "triggers" the antenna array and assigns a computer clock time to each trigger (GPR scan). This data is stored in the TMF file created by DAS 102; previously created by the Terravision software program. The DAS software 102 simultaneously records the position messages from an external positioning device 104 (GPS receiver, laser tracking theodolite, etc) and also tags each position message with the same computer clock time. In this manner, it is possible to compute and apply a GPS position to each GPR scan for all 14 data channels.

Extensive testing of this approach demonstrated that the target offsets noted in the GPR data sets had now been minimized. With the application of a 0.12 sec constant time offset value, the positions of the detected are corrected such that buried utility lines appear as linear features. Also noted with the incorporation of the ECM device 96, the buried features detected with the Terravision GPR system are now positioned correctly with respect to the directly measured position; i.e. there are no positioning offsets.

The ECM device 96 was also incorporated into the single-channel SIR-3000 GPR system and found to correct the target offset issues noticed earlier. This successful integration of the ECM device 96 into the SIR-3000 GPR system demonstrates that the positioning correction methodology of the present invention can be applied in any device or system by which a wheel encoder or similar device is used to trigger a response or quantify an action, and may benefit from this approach; especially if a specific spatial position will be assigned to the data recorded. This may be other GPR systems or geophysical instruments where the precise position of the recorded data is important.

It is considered desirable, although not required, that the encoder counts and the external positioning information be recorded on the same acquisition computer. Previous approaches indicate that acquisition software packages directly apply positioning coordinates to the acquired data points. In this manner, the same positioning coordinate may be applied to several distinct data points if the data is acquired faster than the geospatial position is updated. The approach taken with the ECM device 96 is that the computer clock time is assigned to both the recorded encoder response and GPS position message. The computer clock time can be updated much more rapidly than the encoder trigger and the GPS position. Merging the two data sets result in a unique geospatial position for each encoder response.

The ECM module can potentially be used for any distance-based sensor in which data readings are triggered by an encoder wheel. It is specifically advantageous for use with closed/black-box systems where the user has little or no control over the internal timing of the system.

Although only examples of certain configurations and functions may be described as being performed by circuitry for the sake of brevity, any of the functions, methods, and techniques can be performed using circuitry and methods described herein, as would be understood by one of ordinary skill in the art.

What is claimed is:
1. A system, comprising:
a mobile ground penetrating radar (GPR) system, comprising:
an apparatus configured for movement over terrain;
a GPR sensor mounted to the apparatus and configured to produce GPR scan data;
a positioning sensor supported by the apparatus;

a wheel encoder supported by the apparatus and configured to generate trigger signals for initiating GRP sensor scans; and a processor coupled to memory and supported by the apparatus, the processor coupled to the GPR sensor, the positioning sensor, and the wheel encoder, the processor configured to execute program instructions stored in the memory for collecting data for each GPR scan and recording position data for each GPR scan;

wherein a variable time delay results between a time when the GPR scan data is collected and a time when the position data associated with the GPR scan data is recorded;

an encoder capture module (ECM) adapted for attachment to the apparatus, the ECM comprising:
  an input adapted to receive the trigger signals generated by the wheel encoder;
  circuitry coupled to the input and configured to generate an ECM signal based on each trigger signal and a calibration value; and
  an output; and a data acquisition system coupled to the output of the ECM and configured to receive GPR scan data from the GPR sensor, positioning data from the positioning sensor, and the ECM signals from the ECM, the data acquisition system configured to generate a DAS timestamp in response to each ECM signal and to associate the DAS timestamp with the GPR scan and the GPS position associated with the GRP scan, so as to substantially eliminate the variable time delay.

2. The system of claim 1, wherein a distance between GPR scans as computed from the GPS position data is not the same as that which can be computed using the wheel encoder due to the variable time delay.

3. The system of claim 1, wherein the variable time delay is unpredictable with respect to when the variable time delay occurs.

4. The system of claim 1, wherein the variable time delay is uncorrectable by way of introduction of a constant time offset applied between the time when data for each GPR scan is collected by the processor and the time when the position associated with each GPR scan is recorded by the processor.

5. The system of claim 1, wherein the ECM comprises a controller and a counter.

6. The system of claim 5, wherein the counter comprises a quadrature cycle counter.

7. The system of claim 1, wherein the calibration value is indicative of a predetermined relationship between a number of wheel encoder ticks and a known distance.

8. The system of claim 1, wherein communication between the ECM and the DAS is bidirectional, and the calibration value is transmitted by the DAS to the ECM.

9. The system of claim 1, wherein the DAS is configured to generate a position marker file comprising data of each GPR scan and a timestamp associated with the data of each GPR scan.

10. A system, comprising:
a mobile geophysical instrument configured for traversing along an above-ground path, a processor, a distance transducer configured to produce trigger signals, and a position sensor, the geophysical instrument configured to produce a plurality of geophysical data sets as the geophysical instrument traverses the above-ground path, wherein data for each geophysical data set is associated with a position computed by use of the position sensor, a variable time delay resulting between a time when data for each geophysical data set is collected by the processor and a time when a position associated with each geophysical data set is recorded by the processor;

a module adapted for attachment to the geophysical instrument, the module comprising:
  an input adapted to receive the distance transducer data;
  circuitry coupled to the input and configured to generate a module signal based on each trigger signal and a calibration value; and
  an output; and a data acquisition system (DAS) coupled to the output of the module and configured to receive geophysical data sets from the geophysical instrument, positioning data from the positioning sensor, and the module signals, the data acquisition system configured to generate a DAS timestamp in response to each module signal and to associate the DAS timestamp with each geophysical data set and a position associated with the geophysical data set, so as to substantially eliminate the variable time delay.

11. The system of claim 10, the geophysical instrument comprises a ground penetrating radar.

12. The system of claim 10, the distance transducer comprises a wheel encoder.

13. The system of claim 10, wherein the module comprises a controller and a quadrature cycle counter.

14. The system of claim 10, wherein the calibration value is indicative of a predetermined relationship between a number of distance transducer output intervals and a known distance.

15. The system of claim 10, wherein communication between the module and the DAS is bidirectional, and the calibration value is transmitted by the DAS to the module.

16. The system of claim 10, wherein the DAS is configured to generate a position marker file comprising data of each geophysical data set and its associated timestamp.

17. A module adapted for use with a system comprising a data acquisition system (DAS) and a mobile ground penetrating radar (GPR) system, the GPR system comprising a GPR sensor, a processor, a distance transducer configured to produce trigger signals, and a position sensor, the GPR system configured to produce scans of GPR data, wherein data for each GPR scan is associated with a position computed by use of the position sensor, a variable time delay resulting between a time each scan of GPR data is collected by the processor and a time a position associated with each scan of GPR data is recorded by the processor, and the DAS configured to receive GPR scan data from the GPR sensor, positioning data from the positioning sensor, and signals from the module, the DAS configured to generate a DAS timestamp based on each module signal and to associate the DAS timestamp with each GPR scan and a position associated with the GRP scan, the module comprising:
  an input adapted to receive the trigger signals;
  circuitry coupled to the input and configured to generate a module signal based on each trigger signal and a calibration value; and
  an output that provides the module signal for use by the DAS to generate a DAS timestamp that can be associated with each GPR scan and a position associated with the GRP scan so as to substantially eliminate the variable time delay.

18. The module of claim 17, comprising a controller and a counter.

19. The module of claim 17, comprising a controller and a quadrature cycle counter.

20. A system, comprising:
a wheel encoder;
a time-based sensor;

a distance-based sensor coupled to the wheel encoder, wherein sensor readings from the distance-based sensor are made in response to trigger signals produced by the encoder wheel;

an encoder module configured to receive the trigger signals and generate encoder module signals using the trigger signals and a calibration value;

a computer clock time generator responsive to the encoder module signals and configured to assign a computer clock time to the sensor readings from the distance-based sensor and to sensor readings from the time-based sensor; and a processor configured to merge the distance-based sensor readings with the time-based sensor readings based on synchrony between the respective computer clock times of the distance-based sensor readings with the time-based sensor readings, the processor configured to generate an output file comprising at least the distance-based sensor readings and their respective computer clock times.

21. The system of claim 20, wherein the processor is configured to produce a geospatial position for each encoder module signal.

22. The system of claim 20, wherein the distance-based sensor comprises a geophysical instrument and the time-based sensor comprises a position sensor.

23. The system of claim 20, wherein the distance-based sensor comprises a ground penetrating radar and the time-based sensor comprises a GPS sensor.

24. A method, comprising:

collecting a plurality of geophysical data sets in response to trigger signals produced by a distance transducer while a geophysical instrument traverses an above-ground path;

computing a position of the geophysical instrument while the geophysical instrument traverses the above-ground path;

associating, in response to the trigger signals, the geophysical data sets with computed positions, a variable time delay resulting between a time when data for each geophysical data set is collected and a time when the position associated with each geophysical data set is recorded;

producing an adjusted trigger signal based on each trigger signal and a calibration value;

generating a timestamp that can be associated with each geophysical data set and a position associated with the geophysical data set so as to substantially eliminate the variable time delay.

* * * * *